(12) United States Patent
Scopes

(10) Patent No.: US 8,369,497 B2
(45) Date of Patent: Feb. 5, 2013

(54) ENHANCED VOICEMAIL SYSTEM AND METHOD

(76) Inventor: Philip M. Scopes, Chicago, IL (US)

( * ) Notice: Subject to any disclaimer, the term of this patent is extended or adjusted under 35 U.S.C. 154(b) by 1297 days.

(21) Appl. No.: 12/103,907

(22) Filed: Apr. 16, 2008

(65) Prior Publication Data

US 2009/0262910 A1  Oct. 22, 2009

(51) Int. Cl.
*H04M 1/64* (2006.01)

(52) U.S. Cl. ............... 379/88.25; 379/88.04; 379/88.13; 379/88.17; 379/88.23; 379/67.1; 455/413

(58) Field of Classification Search ............... 379/88.23, 379/67.1, 88.25, 88.17, 88.13, 88.04; 455/413
See application file for complete search history.

(56) References Cited

U.S. PATENT DOCUMENTS

| | | | |
|---|---|---|---|
| 6,233,318 B1 * | 5/2001 | Picard et al. ............... | 379/88.17 |
| 7,023,968 B1 * | 4/2006 | Silvester .................... | 379/88.13 |
| 7,221,742 B1 * | 5/2007 | Baker et al. ................ | 379/88.23 |
| 7,620,161 B2 * | 11/2009 | Liu et al. .................... | 379/88.25 |
| 2007/0274468 A1 * | 11/2007 | Cai .............................. | 379/67.1 |
| 2008/0165937 A1 * | 7/2008 | Moore ........................ | 379/88.04 |
| 2008/0167014 A1 * | 7/2008 | Novick et al. ................ | 455/413 |

\* cited by examiner

*Primary Examiner* — Fan Tsang
*Assistant Examiner* — Van D Huynh
(74) *Attorney, Agent, or Firm* — McAndrews, Held & Malloy, Ltd.

(57) ABSTRACT

A system for processing voicemail is provided that includes a voicemail database processor establishing one or more of an accounts table, a messages table, a distribution list table, a distribution lists members tables, and a delete request table. In operation a message navigation menu is provided to a user to allow the user to move back and forth a specified number of voicemails, change between urgent and normal priority voicemails, retrieve messages only from a specific mailbox or from outside the system, or initiate an improved deletion operation.

11 Claims, 8 Drawing Sheets

| ACCOUNTS TABLE ||
| Mailbox A | Extension Number ~215 |
| | Internal ID ~220 |
| Mailbox B | Extension Number ~245 |
| | Internal ID ~250 |
| Mailbox N | Extension Number ~285 |
| | Internal ID ~290 |

| MESSAGES TABLE ||  |
|---|---|---|
| Voicemail A | Internal Message ID | 315 |
|  | ID of Sender's Box | 320 |
|  | ID of Recipient's Box | 325 |
|  | Name of sound file | 330 |
|  | ID of attached forwarded message | 335 |
|  | Delivery date and time | 340 |
|  | Deleted Flag | 345 |

• • •

| | | |
|---|---|---|
| Voicemail N | Internal Message ID | 355 |
|  | ID of Sender's Box | 360 |
|  | ID of Recipient's Box | 365 |
|  | Name of sound file | 370 |
|  | ID of attached forwarded message | 375 |
|  | Delivery date and time | 380 |
|  | Deleted Flag | 385 |

Figure 3

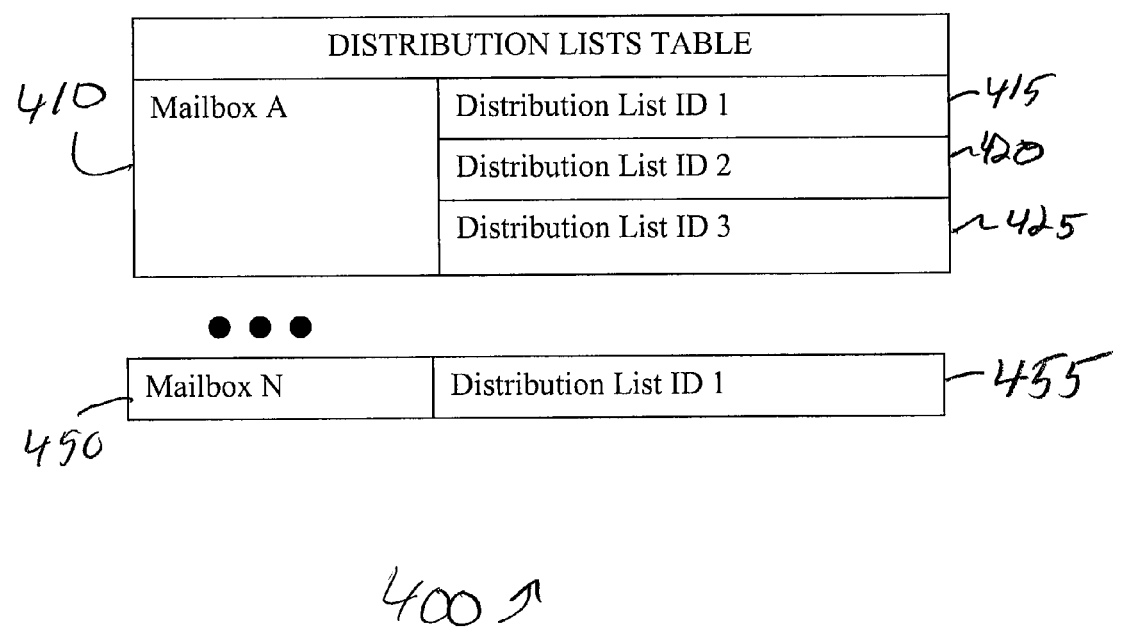

| DISTRIBUTION LISTS TABLE ||
|---|---|
| Mailbox A | Distribution List ID 1 |
|  | Distribution List ID 2 |
|  | Distribution List ID 3 |

• • •

| Mailbox N | Distribution List ID 1 |
|---|---|

Figure 4

| DISTRIBUTION LIST MEMBERS TABLE ||
|---|---|
| Distribution List ID 1 | Member Internal ID 1 |
| | Member Internal ID 2 |
| | Member Internal ID 3 |

• • •

| | |
|---|---|
| Distribution List ID N | Member Internal ID 1 |

Figure 5

| DELETE REQUEST TABLE |
| --- |
| ID of Mailbox initiating delete request |
| ID of Mailbox having messages to be deleted |
| Folder of the messages to be deleted |
| Priority status of the messages to be deleted |
| Done Flag |

Figure 6

ENHANCED VOICEMAIL SYSTEM AND METHOD

BACKGROUND OF THE INVENTION

The present invention generally relates to a voicemail system. More particularly, the present invention relates to an improved system and method for navigating messages stored on a voicemail system Voicemail systems are currently in wide use in both businesses and residences. In a standard voicemail system, an incoming phone message is recorded and stored in a voicemail system for later retrieval and playback by the operator of the voicemail system. Additionally, since the concept of voicemail was invented, it has been used in a variety of settings. For example, businesses and residences use voicemail to receive messages from individuals when the called party cannot be reached directly. Also, voicemail may be used internally within an organization to send messages to staff members, for example, if they cannot be spoken to directly at the moment. Furthermore, distribution lists may be defined and used so that a user of the voicemail system may record a single message and then have the message automatically copied and sent to the multiple recipients set forth in the distribution list. For example, a department head may have a distribution list including each of the department head's subordinates, and the department head may record a single voicemail message and use the distribution list to have the single voicemail message automatically copied and distributed to the voicemail of each person on the distribution list.

As is readily appreciated from the examples above, over the years voicemail has evolved to a point that distribution lists have begun to influence the way in which voicemail is used. However, the standard playback controls provided by current voicemail user interfaces are clunky an inelegant. For example, if a particular voicemail box receives a large number of messages, a user must typically spend a considerable amount of time listening to each message sequentially and is unable to sort the voicemails in a way that may provide greater convenience and speed. Further, because of the way a typically voicemail system performs commands initiated by a user, the user may perceive the voicemail system as slow or non-responsive.

BRIEF SUMMARY OF THE INVENTION

One or more embodiments of the present invention provide a system for processing voicemail that includes a voicemail database processor establishing one ore more of an accounts table, a messages table, a distribution list table, a distribution lists members tables, and a delete request table. In operation a message navigation menu is provided to a user to allow the user to move back and forth a specified number of voicemails, change between urgent and normal priority voicemails, retrieve messages only from a specific mailbox or from outside the system, or initiate an improved deletion operation.

BRIEF DESCRIPTION OF THE DRAWINGS

FIG. 2 illustrates an accounts table according to an embodiment of the present invention.

FIG. 3 illustrates a messages table according to an embodiment of the present invention.

FIG. 4 illustrates a distribution lists table according to an embodiment of the present invention.

FIG. 5 illustrates a distribution list members table according to an embodiment of the present invention.

FIG. 6 illustrates a delete request table according to an embodiment of the present invention.

DETAILED DESCRIPTION OF THE INVENTION

Figure 1:
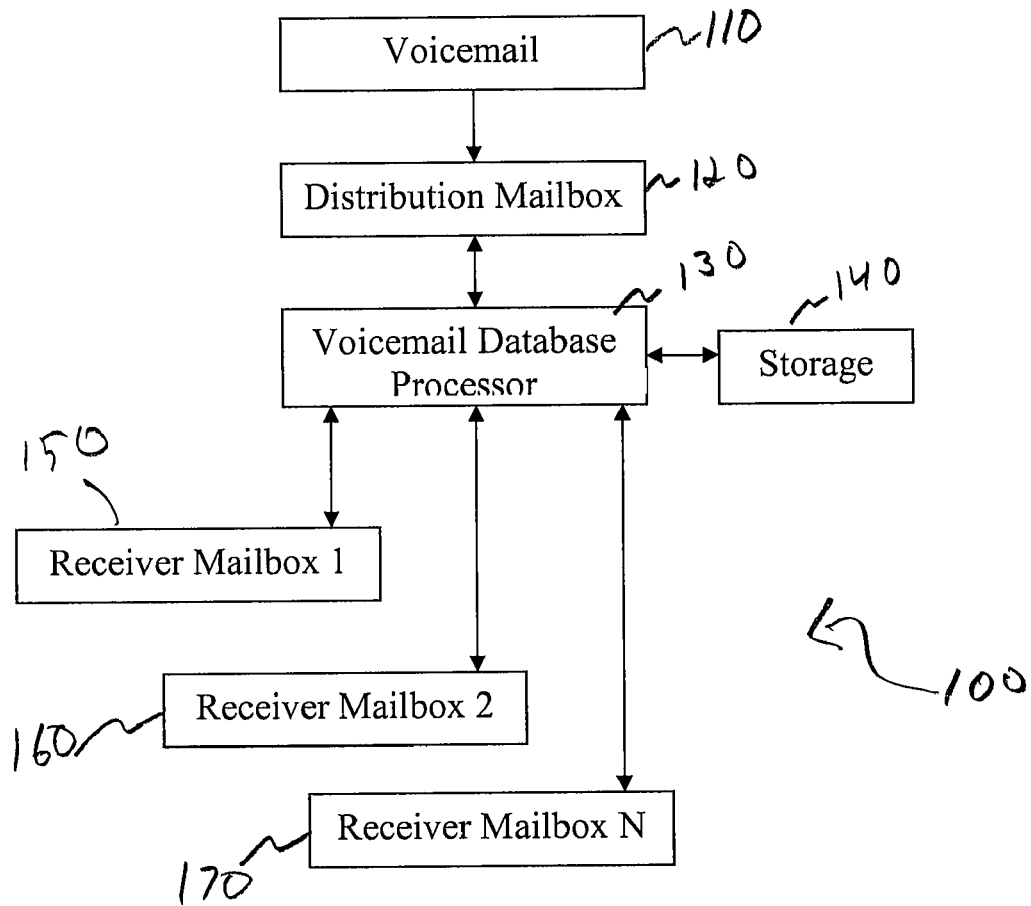
FIG. 1 illustrates an improved voicemail system according to an embodiment of the present invention.

One embodiment of the present invention provides an improved voicemail system that allows users to automatically send messages to multiple recipients in such a way that facilitates group discussions. For example, as further described below, a user of a voicemail box may act as a moderator and, upon receiving a message intended for a discussion group, the moderator may forward the message out to the group. The moderator may also originate new messages and send them out to the entire group of boxes in a distribution list.

Attempting to implement such a system with present voicemail systems presents several problems. For example, in such a system, the number of messages one mailbox receives may be quite large, and navigating and managing these messages using the current controls available in a voicemail user interface may be quite difficult. Further, the large number of voicemails may be a strain on the database holding the pointers to the voicemails or the voicemails themselves. For example, searching, parsing, or retrieving the voicemails in a large database may incur an undesirable delay.

Further, traditional voicemail systems allow you to retrieve messages only in the order they are sent, or in reverse order, and may possibly allow messages to be designated as "urgent" to be placed at the beginning of the message list, ahead of those not marked "urgent." However, if one were to get messages from one or more discussion groups, and the number of messages in the voicemail box grows considerably to hundreds or thousands of messages, the following problems render the traditional voicemail system unsatisfactory:

First, to find a particular message in the mailbox in the prior art voicemail system, one has to advance through every message before it, one by one, using a touch-tone command. With potentially thousands of messages through which to advance, this may take a considerable amount of time.

Second, in the prior art voicemail system, if a user decides they want to go through messages all from a particular individual or discussion group, one has to advance through potentially many messages from many other senders to get to the messages of interest.

Third, in the prior art voicemail system, if one wishes to delete all the messages in the mailbox, one may only be able to delete them one-by-one which may take considerable time to issue the touch-tone command for each message. A voicemail system may offer an option to delete all messages, but this results in a highly-intensive database query being performed which may take considerable time while the voicemail user waits on the telephone line. Further, this database query may be so intensive that it may result in other queries of the message list from other phone lines to be delayed or rejected by the database server. Also, with a large number of messages from various mailboxes available, one may wish to delete only a portion of those messages, choosing between urgent or normal messages, new or saved messages, or messages only from a specific box or from outside callers.

One or more of the embodiments of the present invention represent systems and methods that provide an improved interface control for a voicemail system and an improved database management system for a voicemail system, as further described below.

FIG. 1 illustrates an improved voicemail system 100 according to an embodiment of the present invention. The voicemail system 100 includes a voicemail 110, a distribution mailbox 120, a voicemail database processor 130, storage memory 140, and several receiver mailboxes, receiver mailbox 1 150, receiver mailbox 2 160, and receiver mailbox N 170.

In operation, a voicemail 110 is sent to a distribution mailbox 120. The voicemail 110 may be sent by one of the receiver mailboxes 150-170, may originate with the user of the distribution mailbox 120, or may come from outside the voicemail system from a user without a mailbox. The voicemail 110 is received by the distribution mailbox 120, and then passed to the voicemail database processor 130. The voicemail database processor stored the voicemail 110 in the storage memory 140 and then awaits commands from the distribution mailbox 120. For example, the distribution mailbox 120 may instruct the voicemail database processor 130 to send copies of the voicemail to each of the receiver mailboxes 150-170 that is identified on a specific distribution list at the voicemail database processor 130.

The voicemail database processor 130 uses an improved voicemail database management system, as further described below, to process the commands from the distribution mailbox (or any other mailbox) quickly and efficiently.

Additionally, although only three receiver mailboxes are shown in FIG. 1, a considerably larger number of mailboxes are implemented in a typical system. Further, although the distribution mailbox is associated with a distribution list in FIG. 1, each of the receiver mailboxes may be associated with its own distribution list or lists, as further described below.

Also, the voicemail database processor is preferably a database running in a relational database environment such as a Microsoft SQL Server. The database processor preferably includes the tables shown in FIGS. 2-6 below. Additionally, in the discussion below, the abbreviation "ID" is used to mean "identification" or "identifier" as required in context.

FIG. 2 illustrates an Accounts Table 200 according to an embodiment of the present invention. The accounts table 200 includes Mailbox A 210, Mailbox B 240, and Mailbox N 280. Each mailbox is associated with an extension number and an internal ID. That is, Mailbox A 210 is associated with extension number 215 and internal ID 220, Mailbox B 240 is associated with extension number 245 and internal ID 250, and Mailbox N 280 is associated with extension number 285 and internal ID 290.

The accounts table 200 identifies each active mailbox on the system. That is, each mailbox in the system includes an entry in the accounts table 200. Although the accounts table 200 of FIG. 2 shows three mailboxes, a greater or lesser number of mailboxes may be employed. Additionally, although two data fields are shown for each mailbox, a greater or lesser number of data fields may be employed.

The extension number associated with each mailbox is an indication of the telephone extension that a user dials in order to record messages in that mailbox. The internal ID is an internal references number creased by the voicemail database processor that is used as an internal reference for a specific extension number.

FIG. 3 illustrates a Messages Table 300 according to an embodiment of the present invention. The messages table 300 includes Voicemail A 310 and Voicemail N 350. Voicemail A 310 includes an internal message ID 315, the ID of a sender's mailbox 320, the ID of a recipient's mailbox 325, a sound file name 330, an ID of an attached forwarded message 335, a delivery date and time 340, and a deleted flag 345. Similarly, Voicemail N 350 also includes an internal message ID 355, the ID of a sender's mailbox 360, the ID of a recipient's mailbox 365, a sound file name 370, an ID of an attached forwarded message 375, a delivery date and time 380, and a deleted flag 395.

Each voicemail stored in the system is represented in the messages table 200. Thus, for each voicemail the system creates a data table with an assigned internal messaged ID 315. Further, the entry includes the internal ID of the mailbox of the sender 320. Alternatively, if the voicemail has been received from an outside call, the sender ID may be a different predetermined code such as zero, for example. Also included is the ID of a recipient's mailbox 325 of the recipient of the voicemail, as well as the name of the sound file containing the audio recording of the voicemail message. The name of the sound file is typically automatically signed internally by the voicemail system as field 330.

The message table 200 also includes an entry so that if a voicemail is forwarded from a first recipient to a second recipient and the first recipient records an additional introduction voicemail to be sent to the second recipient with the original voicemail, then when the voicemail entry in the messages table 300 is for the additional introduction e-mail, the voicemail entry also includes an ID of the forwarded message to which the additional introduction voicemail has been attached as field 335.

Also, the voicemail A entry 310 includes an indication of the date and time that the voicemail was originally delivered to a mailbox as field 340. Finally, a deleted flag 345 is included. As further described below with regard to the deletion process, the deletion flag is set to false until the voicemail A 310 is deleted at which point the deleted flag is set to true.

Although the messages table 300 shows seven data fields associated with each voicemail, a lesser or greater number of data fields may be employed. Additionally, although only two voicemails are illustrated in FIG. 3, in a typical system hundreds or thousands of voicemails are included in the messages table.

FIG. 4 illustrates a distribution lists table 400 according to an embodiment of the present invention. The distribution lists table 400 includes an entry for each mailbox that has a distribution list and identifies each distribution list associated with each mailbox. As shown in the example of FIG. 4, the distribution lists table includes a first mailbox, Mailbox A 410, and a second mailbox, Mailbox N 450. Mailbox A 410 is associated with three distribution lists: Distribution List ID Number 1 415, Distribution List ID Number 2 420, and Distribution List ID Number 3 425. Mailbox N 450 is associated with only a single distribution list, Distribution List ID Number 1 455

The distribution list ID numbers are preferably automatically assigned by the voicemail system. Further, although the distribution lists table 400 shows two mailboxes, a much larger number of mailboxes is typically employed. Further, although the example mailboxes shown in FIG. 4 are associated with three and one distribution lists respectively, a mailbox may be associated with any number of distribution lists selected by the owner of the mailbox. Also, in the embodiment of FIG. 4, if a mailbox is not associated with any distribution lists then the mailbox is not included in the distribution lists tables 400. Alternatively, in another embodiment, if a mailbox is not associated with any distribution lists, then the mailbox may be included in the distribution lists table, but associated with a predetermined value, such as zero, for example, instead of a distribution list ID.

FIG. 5 illustrates a distribution list members table 500 according to an embodiment of the present invention. The distribution list members table 500 includes an entry for each distribution list and a listing of the mailboxes associated with each distribution list. Thus, the distribution list members table 500 includes distribution list ID 1 510 and distribution list ID N 550. Distribution list ID 1 510 is associated with member internal ID 1 515, member internal ID 2 520, and member internal ID 3 525. Distribution list ID N 550 is associated with member internal ID 1 555.

As mentioned above, the distribution list ID numbers and the member internal ID numbers are preferable automatically assigned by the voicemail system. Further, although the distribution list members table shows two distribution lists, in practice a much greater number of distribution lists is likely to be implemented. Similarly, although distribution list ID 1 510 is associated with three members of the distribution list, a greater of lesser number of members may be associated with a distribution list ID. Further, in practice the number of members of a distribution list may be quite large.

FIG. 6 illustrates a delete request table 600 according to an embodiment of the present invention. The delete request table 600 includes a first data field 610 storing the internal ID number of the mailbox that initiated the delete request and a second data field 620 storing the internal ID number of the mailbox from which the messages are to be deleted. Additionally, the delete request table 600 includes a data field 630 identifying the folder of the messaged to be deleted and a field 640 identifying the priority status of the messages to be deleted. Finally, the delete request table 600 includes a done flag 650.

More specifically, and as further described below, if a user of the mailbox system desires to delete all voicemails that have been received from a particular sender mailbox, then the internal ID of the sender mailbox is stored in the second data field 620. Alternatively, if the user of the voicemail system wishes to delete all messages from all mailboxes, the second data field 620 may include a predetermined identifier, such as zero, for example. Also, if the user of the voicemail system wishes to delete all messages received from outside (these messages are not associated with a mailbox), then the second data field 620 may include a different predetermined identifier, such as one, for example.

The third data filed 630 preferably includes an entry designating the folder of the messages to be deleted. For example, the folders may include the logical groupings of new messages, saved messages, or all messages, for example. Further, each folder may be identified by a different predetermined identifier such as zero for the new folder, one for the saved folder, and negative one for the all messages folder. Additional folders and identifiers may be employed.

The fourth data field 640 indicates the priority status of the messages to be deleted. For example, the priority status may be logical grouping representing one of normal status, urgent status, or both normal and urgent status. Further, each priority status may be identified by a different predetermined identifier such as zero for the normal status, one for the urgent status, and negative one for all/both statuses. Additional statuses and identifiers may be employed.

The done flag 650 is set to a first value before the delete operation specified in the delete request table has been completed and is then updated to a second status once the delete request has been completed. For example, the done flag may be set to "False" before the delete operation has been completed and then set to "true" once the delete operation has been completed.

When a message is retrieved from a typical voicemail system, the user is offered several options after the message is played, such as moving the message to the "saved" folder, deleting the message, replying to the message, or skipping to the next message. However, as described above, such options are very rudimentary and are not sufficient for a high-use voicemail system.

Figure 7:
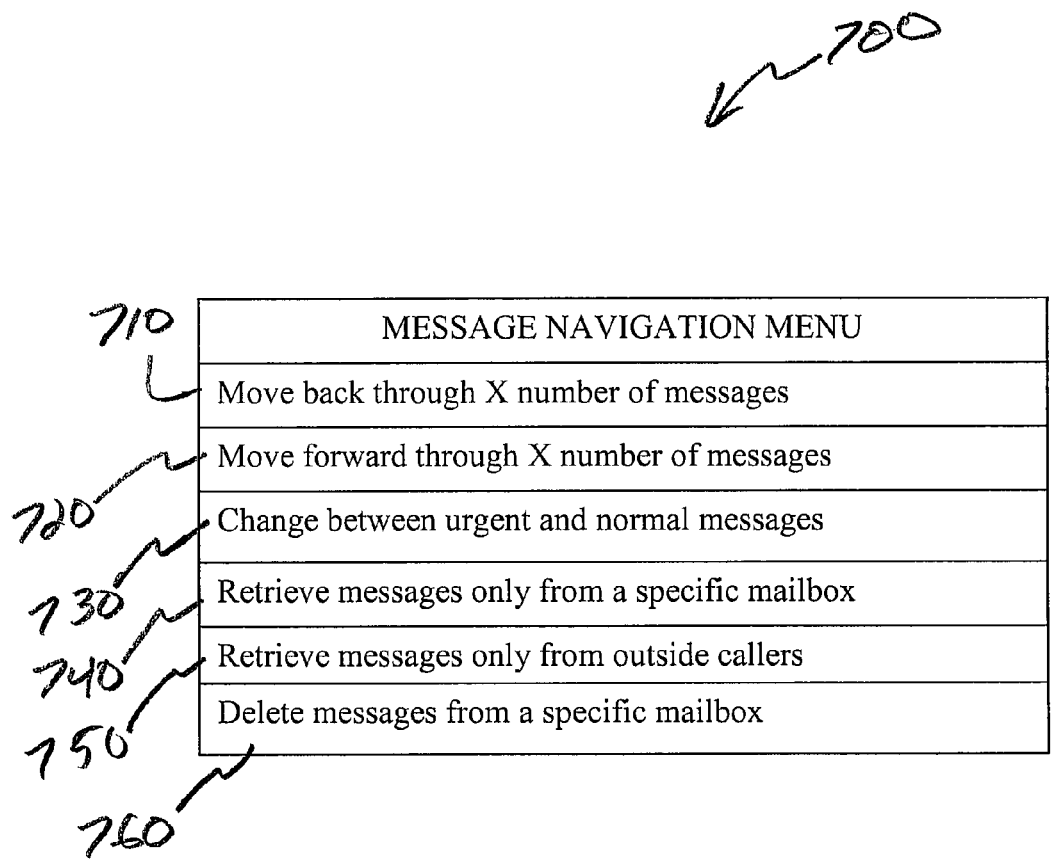
FIG. 7 illustrates an improved voicemail user interface with a message navigation menu.

Consequently, as illustrated in FIG. 7, an improved voicemail user interface with a message navigation menu 700 is provided. The message navigation menu includes the following six functions. The first function 710, allows a user to move back through the messages. When a user selects this function, the user is prompted for a number of messages to skip back. The voicemail system then moves backward through the previous database records assigned to the user's mailbox until the specific number of messages have been skipped. In a first embodiment, the current message is counted as the first of the messages to be skipped, but in an alternative embodiment the current message is not counted.

For the message skipping functions, the system has selected a set of voicemail messages from the database. There is a subquery which has selected messages belonging to the user's mailbox. The set of messages may be further narrowed down according to whether the message is new or saved, and may be narrowed down further to include only messages from a specific mailbox. At this time, the message just played exists as the Current Record (the record or message currently selected). When the menu options are used to move forward or backward through a number of messages, the system will execute a number of "Move Next" or "Move Previous" statements to move forward or backward through the selected set of messages, changing the Current Record, to arrive at the message to which the user wants to skip.

The second function 720 allows a user to skip forward through the messaged. When a user first selects this function, the user is prompted for a number of messages to skip forward. The voicemail system then moves forward through the database records assigned to the user's mailbox until the specific number of messages have been skipped. In a first embodiment, the current message is not counted as the first of the messages to be skipped, but in an alternative embodiment the current message is counted The third function 730 allows a user to cycle between "urgent" messages and "normal" messages. That is, messages received by the voicemail system may be associated with a priority status such as normal or urgent, as discussed above. If the last message retrieved was marked "urgent", the system moves to the first "normal" message in the mailbox. If the last message retrieved was marked "normal", the system resumes message retrieval with the first "urgent" message in the mailbox.

The fourth function 740 allows a user to retrieve voicemails from a mailbox specified by the user. That is, when a user selects the fourth function 740, the user is prompted for a mailbox number. If the mailbox is valid, a new database query is run on the message table to retrieve messages only from that mailbox. If the mailbox number entered is not valid, the user is prompted to re-enter the box number.

The fifth function 750 allows a user to retrieve voicemails from outside callers only. Similar to the fourth function, when a user selects the fifth function 750, a new database query is run on the message table to retrieve messages only from callers outside the system (not from a mailbox on the system).

The sixth function 760 allows a user to delete voicemails that have been received from a specific mailbox, or from outside callers. That is, when the sixth function 760 is selected, the voicemail system initiates a request to delete all messages from a particular mailbox or from outside callers. As further described below, this request is stored in a database as in the "Delete Requests" table described above. The sender, "urgent/normal" status, and "new/saved" status of the messages to be deleted are determined by the parameters of the last message retrieved in a first embodiment. Thus, in a first embodiment, the parameters in the deletion request are set to be the same as those in the last message retrieved. Consequently, when this option is selected, the user is told the box number, priority status, and folder of the messages to be deleted and asked to confirm that this is the desired action. If confirmation is made, the request is written to the "Delete Requests" table and the user is returned to the "message navigation menu."

In an alternative embodiment, the user may be prompted to enter one or more of the box number, priority status, and folder fields. The voicemail system may be optionally reconfirm the user's selections before performing the delete request.

Figure 8:
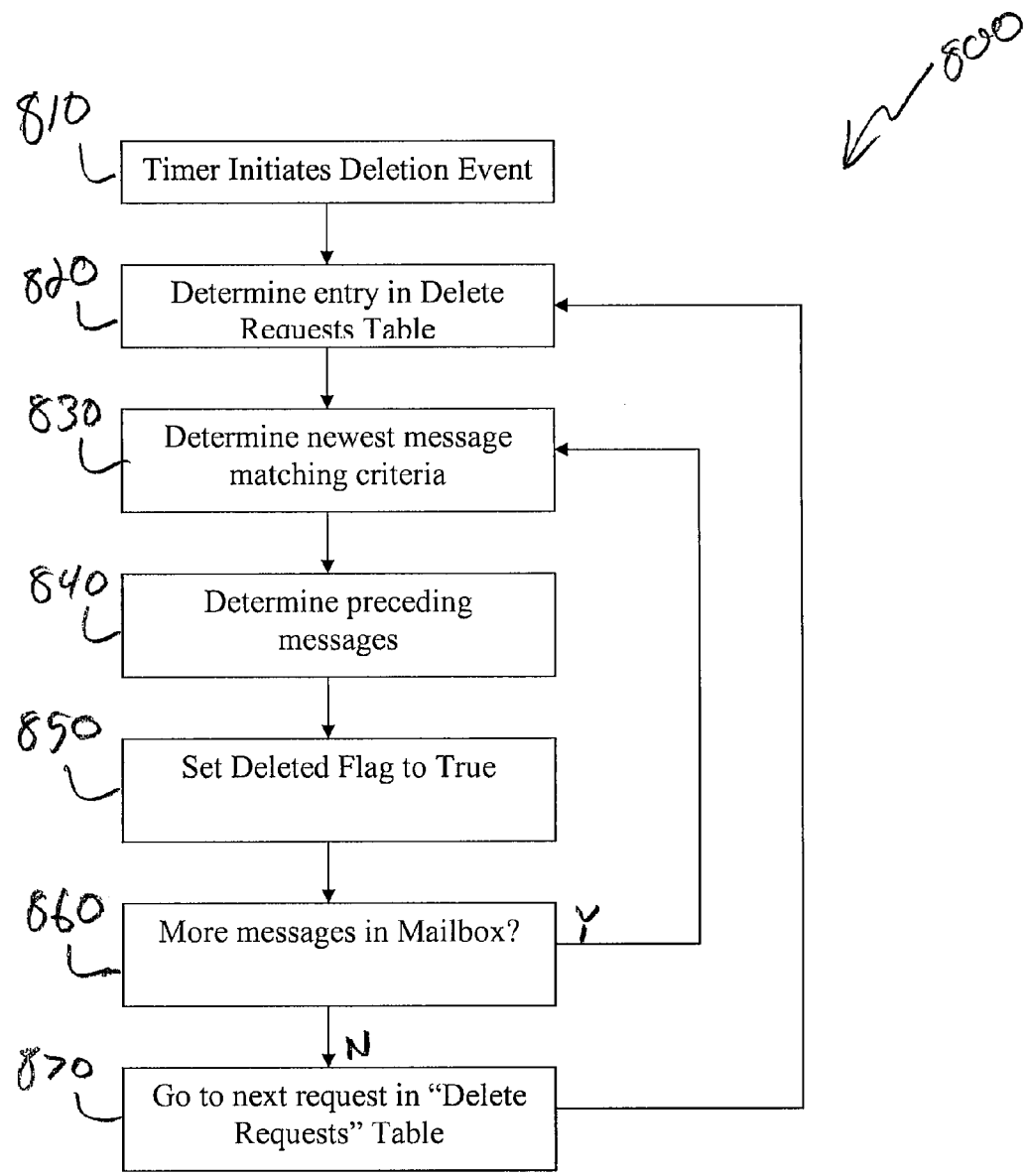
FIG. 8 illustrates a flowchart of the deletion task according to an embodiment of the present invention.

FIG. 8 illustrates a flowchart 800 of the deletion task according to an embodiment of the present invention. To perform the delete option mentioned above in FIG. 7, a background task is created that performs as illustrated in the flowchart 800. First, at step 810, a timer initiates an event after a set period of time (for example. 30 seconds) after the user has selected and confirmed the delete function to indicate when the task should begin. Next, at step 820, the voicemail database processor searches the delete requests table described above and determines all entries in the table in which the done flag has not been set to indicate completion. For each entry in which the done flag does not indicate completion, the processor performs steps 830-860, as described below.

At step 830, the background task executed by the voicemail database processor executes a query on the message table to determine the delivery date and time of the newest message in the group to be deleted. The messages are searched according to the priority, folder, and box number identified in the request.

Next, at step 840, the background task executed by the voicemail database processor executes a query to determine the set of messages which were sent in the 24 hours preceding the message located in step 830, including the most recent message determined in step 830.

Then, at step 850, for each of the selected voicemails, the background task executed by the voicemail database processor updates the deleted flag in for the voicemail in the messages table by setting the deleted flag to True.

At step 860, the background task executed by the voicemail database processor determines if any more messages remain in the mailbox according to the selected delete criteria. If so, then the flowchart proceeds back to step 830. Conversely, if not additional voicemail messages remain in the mailbox for deletion, then the flowchart proceeds to step 870.

At step 870, the background task executed by the voicemail database processor moves to next request in "Delete Requests" table and the flowchart proceeds back to step 820.

Once the background task for message deletion searches for messages to be deleted, the system stores the list of messages in a database query. Starting at the first record present in the query, the system sets the "Deleted" flag, then moves to the next record. This continues until all records found are flagged as "Deleted" and the last record is reached.

Consequently, one or more of the embodiments of the present invention provide an improved control interface for a voicemail system and an improved database management system for a voicemail system. By allowing a user to skip messages back and forth, retrieve messages from a specific mailbox or outside the system, and switch between urgent and normal messages, an improved voicemail system provides a user with better access and retrievability of voicemails and greatly increases the ease and quality of the user experience. Additionally, the scheduling of the deletion operation as a background task also minimizes time delay experiences by the user to provide an improved experience.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A system for processing voicemail, said system including:
   a plurality of voicemail mailboxes; and
   a voicemail database processor, wherein said voicemail database processor includes a database having:
   an accounts table having, for a plurality of said plurality of voicemail mailboxes, an entry identifying each of said plurality of voicemail mailboxes by an extension number and an internal identifier,
   a messages table having, for each of a plurality of voicemail messages, an entry identifying each of said voicemail messages and associating said voicemail message with an internal message identifier, an identification of the sender, an identification of the receiver, an identification of a name of a sound file representing a recording of said voicemail and the delivery time,
   wherein said messages table also includes an entry identifying whether a voicemail has been forwarded from another mailbox.

2. The system of claim 1 wherein said messages table also includes an entry identifying an attached forwarded message when said message has been forwarded from another mailbox.

3. The system of claim 1 wherein said messages table also includes an entry identifying whether a voicemail has been flagged as deleted.

4. A method for processing voicemail, said method including:
   receiving a voicemail at a voicemail database processor and logically associating said voicemail with a messages table, wherein said messages table includes, for each of a plurality of voicemail messages, an entry identifying each of said voicemail messages and associating said voicemail message with an internal message identification and an identification of a mailbox of a recipient;
   providing an audio-driven navigation menu allowing a user to audibly indicate a desired number of messages to skip forward or backward, wherein said user is associated with a user mailbox;
   wherein said navigation menu allows a user to indicate a desired number of messages of two or more,
   reviewing said messages table and determining a plurality of voicemails having said user mailbox as an associated mailbox of a recipient and ordering said plurality of voicemails in chronological order;
   skipping forward or backward through said plurality of chronologically ordered voicemails by the number of messages specified by said user.

5. A method for processing voicemail, said method including:
- receiving a voicemail at a voicemail database processor and logically associating said voicemail with a messages table, wherein said messages table includes, for each of a plurality of voicemail messages, an entry identifying each of said voicemail messages and associating said voicemail message an identification of a mailbox of a recipient and a deleted flag;
- providing an audio-driven navigation menu allowing a user to audibly command the deletion of one or more of said plurality of voicemail messages, wherein said user is associated with a user mailbox;
- reviewing said messages table and determining a plurality of voicemails having said user mailbox as an associated mailbox of a recipient and determining at least one of said plurality of voicemails having said deleted flag set to indicate that said voicemail is not deleted; and
- adjusting said deleted flag to indicate that said voicemail is deleted.

6. The method of claim 5 wherein said messages table includes, for each of a plurality of voicemail messages, an entry identifying a sender associated with said voicemail.

7. The method of claim 6 wherein said user commands the deletion of all messages associated with said sender.

8. The method of claim 7 wherein said reviewing of said messages table determines all messages associated with said sender and deletes all messages associated with said sender.

9. The method of claim 5 wherein said messages table includes, for each of a plurality of voicemail messages, an entry identifying one of a plurality of priorities associated with said voicemail.

10. The method of claim 9 wherein said user commands the deletion of all messages associated with one of a plurality of priorities.

11. The method of claim 10 wherein said reviewing of said messages table determines all messages associated with said one of a plurality of priorities and deletes all messages associated with said one of a plurality of priorities.

* * * * *